United States Patent
Ginestra et al.

(10) Patent No.: US 7,696,120 B2
(45) Date of Patent: Apr. 13, 2010

(54) METHOD OF RESTORING CATALYTIC ACTIVITY TO A SPENT HYDROPROCESSING CATALYST, A SPENT HYDROPROCESSING CATALYST HAVING RESTORED CATALYTIC ACTIVITY, AND A HYDROPROCESSING PROCESS

(75) Inventors: Josiane Marie-Rose Ginestra, Richmond, TX (US); James Dallas Seamans, The Woodlands, TX (US); Kenneth Scott Lee, The Woodlands, TX (US)

(73) Assignee: Shell Oil Company, Houston, TX (US)

( * ) Notice: Subject to any disclaimer, the term of this patent is extended or adjusted under 35 U.S.C. 154(b) by 1019 days.

(21) Appl. No.: 11/039,677

(22) Filed: Jan. 19, 2005

(65) Prior Publication Data
US 2005/0159296 A1    Jul. 21, 2005

Related U.S. Application Data

(60) Provisional application No. 60/537,502, filed on Jan. 20, 2004.

(51) Int. Cl.
*B01J 38/02* (2006.01)
*B01J 21/20* (2006.01)
*B01J 38/48* (2006.01)
*B01J 38/62* (2006.01)
*B01J 38/50* (2006.01)
*B01J 38/12* (2006.01)

(52) U.S. Cl. .......................... 502/56; 502/20; 502/22; 502/29; 502/38; 502/514

(58) Field of Classification Search .............. 502/20, 502/29, 38, 22, 31–32, 56, 514
See application file for complete search history.

(56) References Cited

U.S. PATENT DOCUMENTS 5,254,513 A * 10/1993 Sherwood et al. .............. 502/55

(Continued)

FOREIGN PATENT DOCUMENTS

EP    541994    5/1993

(Continued)

OTHER PUBLICATIONS

Written Opinion for PCT/US2005/001826 of May 17, 2005.

*Primary Examiner*—Karl E Group
*Assistant Examiner*—Noah S Wiese
(74) *Attorney, Agent, or Firm*—Charles W. Stewart

(57) ABSTRACT

Disclosed is method for restoring catalytic activity to a hydroprocessing catalyst that has become spent due to its use or to the deposition of carbon thereon. The method includes a carbon reduction step whereby carbon is removed from the spent hydroprocessing catalyst in a controlled manner to within a specifically defined concentration range. Following the carbon removal step, the resulting catalyst, having a reduced concentration of carbon, is subjected to a chelation treatment whereby the resulting carbon-reduced catalyst is contacted with a chelating agent and aged for a time period necessary for realizing the benefit from the controlled carbon reduction step. In a preferred embodiment, the catalyst resulting from the chelation treatment is subjected to a sulfurization treatment involving the incorporation of elemental sulfur therein and contacting therewith an olefin.

46 Claims, 1 Drawing Sheet

U.S. PATENT DOCUMENTS

| | | | |
|---|---|---|---|
| 5,468,372 A | 11/1995 | Seamans et al. | 208/216 |
| 5,693,582 A * | 12/1997 | Vuitel et al. | 502/41 |
| 5,906,953 A * | 5/1999 | Duddy et al. | 502/27 |
| 6,015,485 A * | 1/2000 | Shukis et al. | 208/112 |
| 6,218,333 B1 | 4/2001 | Gabrielov et al. | 502/216 |
| 6,239,054 B1 * | 5/2001 | Shukis et al. | 502/29 |
| 6,239,066 B1 | 5/2001 | Shukis et al. | 502/355 |
| 6,281,158 B1 * | 8/2001 | Gabrielov et al. | 502/216 |
| 6,291,394 B1 | 9/2001 | Shukis et al. | 502/355 |
| 6,358,639 B2 * | 3/2002 | Oko et al. | 429/17 |
| 6,635,596 B1 | 10/2003 | Eijbouts et al. | 502/38 |
| 2002/0115554 A1 * | 8/2002 | Zhou | 502/28 |

FOREIGN PATENT DOCUMENTS

| | | |
|---|---|---|
| EP | 1043069 A1 | 10/2000 |
| WO | 95/31280 | 11/1995 |
| WO | 01/02092 | 1/2001 |
| WO | WO 0102092 | * 11/2001 |

* cited by examiner

METHOD OF RESTORING CATALYTIC ACTIVITY TO A SPENT HYDROPROCESSING CATALYST, A SPENT HYDROPROCESSING CATALYST HAVING RESTORED CATALYTIC ACTIVITY, AND A HYDROPROCESSING PROCESS

This application claims the benefit of U.S. Provisional Application No. 60/537,502 filed Jan. 20, 2004, the entire disclosure of which is hereby incorporated by reference.

BACKGROUND OF THE INVENTION

This invention relates to a method of restoring catalytic activity to a spent hydroprocessing catalyst, the resulting hydroprocessing catalyst and its use in a hydroprocessing process.

International publication number WO 01/02092 discloses a process for regenerating a used additive-based catalyst. The regeneration step is carried out by contacting the used additive-based catalyst with oxygen at a temperature of no more than 500° C. The resulting regenerated catalyst more preferably has below 1 wt. % carbon content before it is subjected to a rejuvenation step by being contacted with an organic additive. The method of the publication is limited to additive-based catalysts, and the publication does not recognize a need to control the concentration of carbon on the regenerated catalyst to within a specific range in order to obtain a better benefit from its rejuvenation. In fact, this publication suggests that it is best for the carbon content of the regenerated catalyst to be as low as possible before it is undergoes the rejuvenation treatment. This publication does not disclose that its catalyst rejuvenation step requires the organic additive to remain on the catalyst for an aging period prior to drying.

European patent application publication EP 0 541 994 A1 discloses a process for regenerating a hydrogenation catalyst, comprising a support, a Group VI metal and a Group VIII metal, and having coke deposited thereon, by controlling the oxidative burning of the coke so as not to reduce the residual coke content to less than 0.5 weight percent and to control it within the range of from 0.5 to 10.0 weight percent. This publication notes that too severe oxidation conditions can negatively change the pore structure, surface area, and active sites of the catalyst. The publication does not provide experimental data that compares the activity of regenerated catalyst with the activity of the fresh catalyst, but it only presents comparative data for certain physical properties of the two catalysts. Also, nothing is disclosed concerning revitalization of a spent catalyst using chelating agents and the relationship between carbon removal and a chelation treatment.

U.S. Pat. No. 6,239,066 B1 discloses a process for improving the activity of a catalyst by treatment thereof with a chelating agent. It is noted that the treatment method can also be used to improve the activity of a spent catalyst. Exemplary data presented in an example show that a used catalyst that has been both regenerated and then treated with ethylene diamine tetra acetic acid (EDTA) has better improved relative volumetric activity (RVA) than the used catalyst that has only been regenerated. There is no mention of carbon levels that are on the used catalyst, or the regenerated catalyst, or the regenerated and treated catalyst.

There is an ongoing need to find better methods for restoring the activity of catalysts that have lost activity due to their use, particularly, when the catalyst is a spent high activity hydrotreating catalyst.

SUMMARY OF THE INVENTION

Accordingly, in one inventive method provided is a spent hydroprocessing catalyst having a first carbon concentration exceeding about 3 weight percent. The concentration of carbon on the spent hydroprocessing catalyst is reduced to thereby provide a carbon reduced spent catalyst having a second carbon concentration in the range of from about 0.5 weight percent to about 2.5 weight percent. The reduction of the concentration of carbon on the spent hydroprocessing catalyst is done by contacting under carbon burning conditions the spent hydroprocessing catalyst with a gas comprising oxygen and controlling the amount of carbon removed from the spent hydroprocessing catalyst so as to provide the carbon reduced spent catalyst having the second carbon concentration. The carbon reduced spent catalyst is thereafter treated with a chelating agent to provide a revitalized catalyst.

In accordance with another inventive method, catalytic activity of a spent high activity hydroprocessing catalyst having a reduced RVA and a concentration of deposited carbon is restored to a maximized regenerated RVA. This method includes providing a spent high activity hydroprocessing catalyst having the reduced RVA and the concentration of deposited carbon. The spent high activity hydroprocessing catalyst is derived from the use of a high activity hydroprocessing catalyst under hydroprocessing conditions by which carbon is deposited thereon to give the concentration of deposited carbon. The spent high activity hydroprocessing catalyst is heat treated by contacting it with an oxygen-containing gas under carbon burning conditions to thereby provide a heat treated spent high activity hydroprocessing catalyst having a reduced carbon concentration. The reduced carbon concentration is controlled by controlling the carbon burning conditions so as to provide the heat treated spent high activity hydrotreating catalyst having the maximized regenerated RVA.

In accordance with yet another invention, provided is a catalyst having restored activity and comprising a spent hydroprocessing catalyst having deposited thereon a deactivating concentration of carbon, wherein a portion of the deactivating concentration of carbon is removed therefrom by the heat treatment of the spent hydroprocessing catalyst in the presence of an oxygen-containing gas to give an optimized concentration of carbon and, thereafter, the thus-heat treated spent hydrotreating catalyst has been subjected to a chelating treatment.

The catalyst having restored activity and those catalysts made by the aforementioned methods can be used in a hydroprocessing process comprising contacting the revitalized hydroprocessing catalyst with a hydrocarbon feedstock under hydroprocessing conditions.

Other objects and advantages of the invention will become apparent from the following detailed description and appended claims.

DETAILED DESCRIPTION OF THE INVENTION

Figure 1:
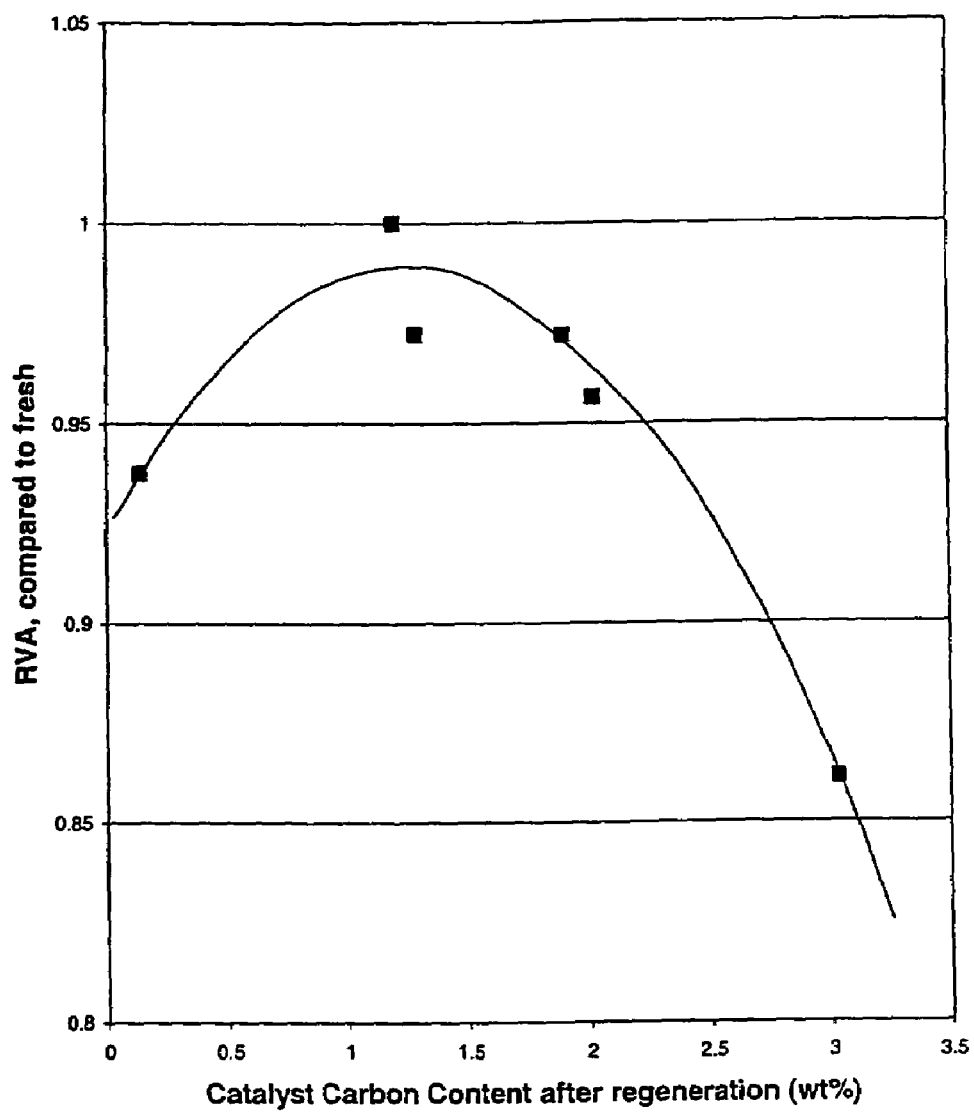
FIG. 1 is a plot of the relative volumetric activity of a revitalized hydrotreating catalyst, which was prepared by the inventive method whereby a spent hydrotreating catalyst was treated first by removing a portion of the carbon thereon followed by a chelation treatment, as a function of the remaining carbon content of the spent hydrotreating catalyst after the carbon removal step.

The invention relates to a method of restoring catalytic activity to a hydroprocessing catalyst that has become spent due to its use. The invention further relates to a method for maximizing the amount of restored catalytic activity to the spent hydroprocessing catalyst. Also, the invention relates to a revitalized hydroprocessing catalyst and other catalyst compositions made by the treatment of a spent hydroprocessing catalyst using the inventive methods described herein. Further, the invention relates to a hydroprocessing process that utilizes the revitalized hydroprocessing catalysts and other spent catalysts having restored catalytic activity of the invention.

The hydroprocessing catalyst of the invention can be any suitable hydrogenation catalyst including conventional hydroprocessing catalysts that comprise a metal component on a support material. The metal component can include a Group VIB metal component or a Group VIII metal component, or both metal components. It is preferred for the hydroprocessing catalyst to comprise both a Group VIB metal component and a Group VIII metal component. The hydroprocessing catalyst can also include a promoter such as a phosphorous component.

The Group VIII metal component of the hydroprocessing catalyst composition are those Group VIII metal or metal compounds that, in combination with the other components of the catalyst composition, suitably provide a hydroprocessing catalyst. The Group VIII metal can be selected from the group consisting of nickel, cobalt, palladium and platinum. Preferably, the Group VIII metal is either nickel or cobalt and, most preferably, the Group VIII metal is cobalt.

The Group VIII metal component contained in the hydroprocessing catalyst composition can be in the elemental form or in the form of a metal compound, such as, for example, oxides, sulfides and the like. The amount of Group VIII metal in the hydroprocessing catalyst composition can be in the range of from about 0.1 about 6 weight percent elemental metal based on the total weight of the hydroprocessing catalyst composition. Preferably, the concentration of Group VIII metal in the hydroprocessing catalyst composition is in the range of from 0.3 weight % to 5 weight %, and, most preferably, the concentration is in the range of from 0.5 weight % to 4 weight %.

The Group VIB metal component of the hydroprocessing catalyst composition are those Group VIB metal or metal compounds that, in combination with the other elements of the hydroprocessing catalyst composition, suitably provide a hydroprocessing catalyst. The Group VIB metal can be selected from the group consisting of chromium, molybdenum and tungsten. The preferred Group VIB metal is either molybdenum or chromium and, most preferred, it is molybdenum.

The Group VIB metal component contained in the hydroprocessing catalyst composition can be in the elemental form or in the form of a metal compound, such as, for example, oxides, sulfides and the like. The amount of Group VIB metal in the hydroprocessing catalyst composition can be in the range of from about 5 to about 25 weight percent elemental metal based on the total weight of the hydroprocessing catalyst composition. Preferably, the concentration of Group VIB metal in the hydroprocessing catalyst composition is in the range of from 6 weight % to 22 weight %, and, most preferably, the concentration is in the range of from 7 weight % to 20 weight %.

The support material of the hydroprocessing catalyst can be any material that suitably provides a support for the metal hydrogenation components of the hydroprocessing catalyst including porous refractory oxides. Examples of possible suitable porous refractory oxides include silica, magnesia, silica-titania, zirconia, silica-zirconia, titania, titania-alumina, zirconia-alumina, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The porous refractory oxide generally has an average pore diameter in the range of from about 50 Angstroms to about 200 Angstroms, preferably, from 70 Angstroms to 175 Angstroms, and, most preferably, from 80 Angstroms to 150 Angstroms. The total pore volume of the porous refractory oxide, as measured by standard mercury porisimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram. The surface area of the porous refractory oxide, as measured by the B.E.T. method, generally exceeds about 100 $m^2$/gram, and it is typically in the range of from about 100 to about 400 $m^2$/gram.

One inventive method is specifically directed to the treatment of a high activity hydroprocessing that has become spent catalyst in order to restore a portion of the catalytic activity that has been lost typically due to use or to the deposition of carbon thereon, or to both. This spent high activity hydroprocessing catalyst can have a relative volumetric activity (RVA) that is reduced below its RVA when in a fresh state, and it can have a concentration of deposited carbon.

As the term is used in this specification, "relative volumetric activity" (RVA) refers to the catalytic activity with respect to either hydrodesulfurization (HDS) or hydrodenitrogenation (HDN) of a specific catalyst that has been used relative to the catalytic activity of the same specific catalyst when in its fresh, unused state. Thus, the RVA of the fresh, unused reference catalyst is by definition 1. The RVA of the evaluated catalyst can be represented by the following formula:

$$RVA = (\text{Rate Constant for evaluated catalyst})/(\text{Rate Constant for fresh reference catalyst})$$

where for the case of hydrodesulfurization (HDS) RVA, the Rate Constants are calculated assuming an HDS reaction order of 1.3, and for the case of hydrodenitrogenation (HDN) RVA, the Rate Constants are calculated assuming an HDN reaction order of 1.0.

The high activity hydroprocessing catalyst is a sulfur-treated hydroprocessing catalyst comprising a porous refractory oxide and a metal hydrogenation component and is prepared by a specific method that provides for its high activity and other desirable properties. The high activity hydroprocessing catalyst can be prepared by first combining the porous refractory oxide support material and at least one metal hydrogenation component in a manner so as to include a volatile compound to thereby provide a catalyst precursor. The volatile compound is a compound used in the formation of the catalyst precursor, and it is generally selected from the group consisting of water, organic solvents, such as aliphatic and aromatic hydrocarbons, alcohols, ketones, organic ligands, and any combination thereof. The catalyst precursor, thus, can comprise porous refractory oxide support material, a metal hydrogenation component, and a concentration of the volatile compound. This catalyst precursor is then subjected to a sulfur treatment step to incorporate sulfur, either elemental sulfur or a sulfur compound, or a combination of both, into the catalyst precursor to thereby provide a sulfur treated catalyst precursor. The sulfur treatment step used to provide the sulfur treated catalyst precursor can include the simultaneous or subsequent reduction of the concentration of the volatile compound that is in the catalyst precursor to give the high activity hydrotreating catalyst.

The porous oxide support material and metal hydrogenation components of the catalyst precursor are combined using any suitable and known method for combining such catalyst components and can include such methods as impregnation, co-mulling, and co-precipitation. It is preferred, however, for the porous refractory oxide support material to first be formed into particles, such as extrudates, pills and other agglomerates, and for the metal hydrogenation components to be incorporated into the particles by known incipient wetness impregnation methods.

The metal impregnation solution used to incorporate the metal compound or compounds into the porous refractory oxide support can be the source of the volatile compound and can include, as mentioned above, water, or an alcohol compound, or an organic solvent or a combination thereof. It is preferred for the metal impregnation solution to be an aqueous solution of the metal compound. The metal compounds suitable for use in forming the metal impregnation solution are those compounds that are soluble in the particular solvent used to form the impregnation solution and which are convertible to metal sulfide upon further treatment.

Group VIII metal compounds that may be used in the metal impregnation solution can include, for example, Group VIII metal carbonates, Group VIII metal nitrates, Group VIII metal sulfates, Group VIII metal thiocynates, Group VIII metal oxides and mixtures of any two or more thereof.

Group VIB metal compounds that may be used in the metal impregnation solution can include, for example, Group VIB metal oxides, Group VIB metal sulfides, Group VIB carbonyl compounds, Group VIB acetate compounds, elemental Group VIB metals in solution and mixtures of any two or more thereof. For the preferred Group VIB metal compounds of molybdenum, molybdates and phosphomolybdate can be used.

The concentration of the metal compounds in the metal impregnation solution is selected so as to provide the desired metal concentration in the final catalyst composition. Typically, the concentration of the metal compound in the impregnation solution is in the range of from 0.01 to 100 moles per liter of solution.

The catalyst precursor that is to be further subjected to a sulfur treatment step is to have a concentration of volatile compound of no less than 0.5 weight percent, based on the total weight of the catalyst precursor, and, generally, the amount of volatile compound in the catalyst precursor should be in the range of from 0.5 weight percent to 25 weight percent. The preferred concentration of volatile compound in the catalyst precursor is in the range of from 2 weight percent to 25 weight percent, and, most preferred, it is in the range of from 4 weight percent to 10 weight percent.

While prior to its sulfur treatment the catalyst precursor can, optionally, be dried in order to control the concentration of volatile compound in the catalyst precursor to within the aforementioned ranges, it is not to be subjected to calcination temperature conditions prior to the sulfur treatment step.

Thus, the catalyst precursor is not calcined prior to incorporation therein of sulfur or a sulfur compound. Calcination temperature conditions are those temperatures at or exceeding 400° C., and they are usually in the range of from 400° C. to 600° C. Thus, the catalyst precursor can be exposed to a temperature of less than 400° C. prior to the sulfurization step; provided, the temperature conditions are not such that the resulting concentration of volatile compound in the resultant catalyst precursor is within the desired concentration ranges as noted above. Typically, the catalyst precursor can be dried in the presence of air at a drying temperature in the range from ambient to 400° C., but, more typically, from 30° C. to 250° C.

The catalyst precursor having a concentration of volatile compound within the range as described above undergoes a sulfur treatment step by which sulfur or a sulfur compound is incorporated into the catalyst precursor to thereby provide the high activity hydrotreating catalyst. Any suitable method known to those skilled in the art can be used to treat the catalyst precursor with sulfur or a sulfur compound to yield the high activity hydrotreating catalyst including, for example, both the known in-situ and ex-situ sulfurization and sulfiding methods. The use herein of such terms as sulfur treatment or treatment with sulfur or sulfur-treated or other similar type terminology is meant to refer to and to encompass sulfurization methods and sulfiding methods and methods that include the combination of both sulfurization and sulfiding, whether such methods are performed in-situ (i.e., within a process reactor zone) or ex-situ (i.e., external to a process reactor zone) or by any combination of in-situ or ex-situ treatment methods.

In a typical in-situ sulfiding method, the catalyst precursor is placed in a reactor vessel that defines a reaction zone. A fluid stream containing a sulfur compound is passed over the catalyst precursor and contacted therewith under such suitable temperature conditions as to provide a sulfided catalyst, and, thus, the high activity hydrotreating catalyst. The sulfur compound can include any known and suitable sulfiding agent, such as hydrogen sulfide, organic sulfur compounds that are typically found in petroleum hydrocarbon feeds, and other organic sulfur compounds such as dimethylsulfide, dimethyldisulfide, dimethylsulfoxide, dimethylmercaptan, butylmercaptan, and carbon disulfide. Typical temperatures at which the sulfiding fluid stream is contacted with the catalyst precursor can be in the range of from 150° C. to 400° C., and, more typically, from 200° C. to 350° C.

In the ex-situ sulfiding method, the catalyst precursor is sulfided prior to its loading into the reactor vessel. The ex-situ sulfiding method can include any number of suitable sulfiding methods including, for example, the contacting of the catalyst precursor with a sulfiding agent, such as mentioned above, or with a hydrogen sulfide-containing fluid, under elevated temperature conditions followed by an optional passivation step.

The preferred sulfurization step provides for the incorporation of sulfur into the catalyst precursor by contacting the catalyst precursor with elemental sulfur under conditions that cause the sulfur to be incorporated into the pores of the catalyst precursor either by sublimation or by melting, or by a combination of both. Suitable sulfurization methods for this sulfur incorporation are described in detail in U.S. Pat. No. 5,468,372, which is incorporated herein by reference.

There are two general methods for carrying out the sulfurization of the catalyst precursor with elemental sulfur. The first and preferred method comprises contacting the catalyst precursor with elemental sulfur at a temperature such that the elemental sulfur is substantially incorporated in the pores of the catalyst precursor by sublimation and/or melting and subsequently heating the thus sulfur-incorporated catalyst precursor in the presence of a liquid olefinic hydrocarbon at a temperature greater than about 150° C.

The second method comprises contacting the catalyst precursor with a mixture of powdered elemental sulfur and a liquid olefinic hydrocarbon and heating the resultant mixture of olefin, sulfur and catalyst precursor to a temperature above about 150° C. In this procedure, the heating rate is sufficiently slow such that the sulfur is incorporated into the pores of the catalyst precursor by sublimation and/or melting prior to reaching the temperature at which the olefin reacts to make the sulfur more resistant to removal by stripping.

In the preferred sulfurization method, the catalyst precursor is first contacted with elemental sulfur at a temperature such that the sulfur is incorporated thereon by sublimation and/or melting. While the catalyst precursor can be contacted with sulfur in the molten state, it is preferred to first admix the catalyst precursor with powdered elemental sulfur and then heat the resultant mixture of sulfur and catalyst precursor to above the temperature at which sublimation of the sulfur occurs.

Generally, the catalyst precursor is heated in the presence of the powdered elemental sulfur at a temperature greater than about 80° C. Preferably, this sulfur impregnation step will be carried out at a temperature ranging from about 90° C. to about 130° C. or higher, for example, up to the boiling point of sulfur of about 445° C. It is preferred for the catalyst precursor and sulfur to be heated together at a temperature ranging from about 105° C. to about 125° C. Typically, the catalyst precursor and powdered sulfur is placed in a vibratory or rotary mixer and heated to the desired temperature for sufficient time to allow the sulfur to be incorporated into the pores of the catalyst precursor. The time period for heating typically will range from about 0.1 hour to about 10 hours or longer.

The amounts of sulfur used will depend upon the amounts of catalytic metal present in the catalyst precursor that needs to be converted to the sulfide. Typically the amount of sulfur used is determined on the basis of the stoichiometric amount of sulfur required to convert all of the metal in the catalyst precursor to the sulfide form. For example a catalyst precursor containing molybdenum would require two moles of sulfur to convert each mole of molybdenum to molybdenum disulfide, with similar determinations being made for other metals.

The sulfur-incorporated catalyst precursor is then contacted with a liquid olefin at such an elevated temperature and time period that the olefin reacts and provides the high activity hydrotreating catalyst. Typically, the contact temperature is greater than about 150° C., and, more typically, it will range from about 150° C. to about 350° C., preferably from about 200° C. to about 325° C. Contact times will depend on the temperature and vapor pressure of the olefin, with higher temperatures and higher vapor pressures requiring shorter times. In general, contact times will range from about 0.1 hour to about 10 hours.

It is important for the olefin to be liquid at the elevated temperature of contact. It is preferred for the olefin to be a higher olefin, i.e., one having a carbon number greater than six, preferably greater than eight.

In one embodiment of the preferred sulfurizing method, the catalyst precursor is contacted simultaneously with both the elemental sulfur, preferably in powdered form, and the olefinic hydrocarbon. According to this method, a mixture of powdered elemental sulfur and olefinic hydrocarbon solvent is first produced. A ratio of oil to sulfur by weight ranging from about 1:1 to about 4:1 is suitable, with about 2:1 being a preferred ratio. The mixture may be heated to promote homogenous mixing of the components, particularly if the olefinic hydrocarbon is not liquid at ambient conditions. Toluene or other lightweight hydrocarbon solvents may be added to decrease the viscosity of the mixture. Also, increased heat will achieve the same effect. The mixture of olefin and sulfur is then added to a preweighted catalyst precursor and mixed therewith. The mixture of catalyst precursor, olefin and sulfur is then heated to the olefin reaction temperature of above about 150° C. Preferably, the temperature is in the range of from about 150° C. to about 350° C., and, more preferably, from about 200° C. to about 325° C. The heating time is in the range of from about 0.1 to about 10 hours.

A sulfurized catalyst precursor may also be further treated with sulfur by sulfiding either in-situ or ex-situ or a combination thereof.

A significant aspect of the inventive method is that it is directed to the restoration of the catalytic activity of a hydroprocessing catalyst, including a high activity hydrotreating catalyst, that has been lost as a result of use thereof, such as use under hydrotreating conditions, or carbon deposition thereon. It is understood that, as used in this specification, the term hydroprocessing catalyst is defined as being broad enough to include the high activity hydroprocessing catalyst as described above in detail. Thus, references herein to hydroprocessing catalyst also include or encompass high activity hydroprocessing catalyst. It is recognized that the inventive methods described herein are particularly applicable to the processing of high activity hydrotreating catalyst due to their unique and specific properties.

The hydroprocessing catalyst can be used in the hydrotreatment of a hydrocarbon feedstock under suitable hydrotreatment process conditions. Typical hydrocarbon feedstocks can include petroleum-derived oils, for example, atmospheric distillates, vacuum distillates, cracked distillates, raffinates, hydrotreated oils, deasphalted oils, and any other hydrocarbon that can be subject to hydrotreatment. More typically, the hydrocarbon feedstock that is treated with the hydroprocessing catalyst is a petroleum distillate such as a straight run distillate or a cracked distillate with the hydrotreatment being to remove sulfur from sulfur-containing compounds or nitrogen from nitrogen-containing compounds, or both, from the hydrocarbon feedstock.

More specifically, the hydrocarbon feedstock can include such streams as naphtha, which typically contains hydrocarbons boiling in the range of from 100° C. (212° F.) to 160° C. (320° F.), kerosene, which typically contains hydrocarbons boiling in the range of from 150° C. (302° F.) to 230° C. (446° F.), light gas oil, which typically contains hydrocarbons boiling in the range of from 230° C. (446° F.) to 350° C. (662° F.), and even heavy gas oils containing hydrocarbons boiling in the range of from 350° C. (662° F.) to 430° C. (806° F.)

The hydrotreating conditions to which the hydroprocessing catalyst is subjected are not critical and are selected as is required taking into account such factors as the type of hydrocarbon feedstock that is treated and the amounts of sulfur and nitrogen contaminants contained in the hydrocarbon feedstock. Generally, the hydrocarbon feedstock is contacted with the hydroprocessing catalyst in the presence of hydrogen under hydrotreatment conditions such as a hydrotreating contacting temperature generally in the range of from about 150° C. (302° F.) to about 538° C. (1000° F.), preferably from 200° C. (392° F.) to 450° C. (842° F.) and most preferably from 250° C. (482° F.) to 425° C. (797° F.).

The hydrotreating total contacting pressure is generally in the range of from about 500 psia to about 6,000 psia, which includes a hydrogen partial pressure in the range of from about 500 psia to about 3,000 psia, a hydrogen addition rate per volume of hydrocarbon feedstock in the range of from about 500 SCFB to about 10,000 SCFB, and a hydrotreating liquid hourly space velocity (LHSV) in the range of from about 0.2 $hr^{-1}$ to 5 $hr^{-1}$. The preferred hydrotreating total contacting pressure is in the range of from 500 psia to 2,500 psia, most preferably, from 500 psia to 2,000 psia, with a preferred hydrogen partial pressure of from 800 psia to 2,000 psia, and most preferred, from 1,000 psia to 1,800 psia. The LHSV is preferably in the range of from 0.2 hr–1 to 4 hr–1, and, most preferably, from 0.2 to 3 hr–1. The hydrogen addition rate is preferably in the range of from 600 SCFB to 8,000 SCFB, and, more preferably, from 700 SCFB to 6,000 SCFB.

The spent hydroprocessing catalyst has a catalytic activity lower than the catalytic activity of such catalysts when in the fresh state as reflected in the relative volumetric activity (RVA) being less than 1. Generally, the hydroprocessing catalyst is considered spent when the RVA is less than 0.65, but economic and process considerations usually determine the point at which a catalyst is considered spent. Thus, the spent hydroprocessing catalyst can even have an RVA less than 0.5 and even less than 0.4.

The hydroprocessing catalyst can become spent by use under hydrotreatment conditions as described above. It is generally considered that one cause of the loss of catalytic activity is due to the deposition of carbonaceous material into the pore structure of the hydroprocessing catalyst as a result of its use and that the spent hydroprocessing catalyst can have a carbon content generally above 3 weight percent with the weight percent being based on the total weight of the spent hydroprocessing catalyst including carbon and other components deposited upon the hydroprocessing catalyst. Typically, the carbon content of the spent hydroprocessing catalyst is in the range of from 5 weight percent to 25 weight percent, and, more typically, the carbon content is in the range of from 6 weight percent to 20 weight percent.

An important feature of the inventive method for maximizing the restoration of catalytic activity to the spent hydroprocessing catalyst is for the carbon reduction of the first step to be such as to provide a controlled concentration of carbon on the spent hydroprocessing catalyst such that when it undergoes a subsequent treatment with a chelating agent in accordance with the inventive method a revitalized catalyst having the desired restored catalytic activity is provided.

It has been found, unexpectedly, that to gain the best benefit from the treatment with the chelating agent there is an optimum amount of carbon that should remain on the spent hydroprocessing catalyst after the carbon reduction step. To provide for the best improvement in the restoration of catalytic activity from the chelation treatment, the spent hydroprocessing catalyst should first have its carbon content reduced to a level that is no less than about 0.5 weight percent to thereby provide a carbon-reduced catalyst, and, generally, the carbon concentration of the carbon-reduced catalyst should be in the range of from 0.5 weight percent to 2.5 weight percent. To provide for a greater amount of restored catalytic activity after the chelation treatment, the carbon concentration on the carbon-reduced catalyst should be in the range of from 0.75 weight percent to 2 weight percent, and, preferably, the carbon concentration is in the range of from 1 weight percent to 1.75 weight percent.

If the carbon concentration of the carbon-reduced catalyst is controlled within the required concentration range in accordance with the inventive method, catalytic activity can be restored to the spent hydroprocessing in a manner that an optimum or maximum level of restored catalytic activity is obtained. This maximized regenerated RVA exceeds, and, preferably, substantially exceeds, the reduced RVA of the spent hydroprocessing catalyst. Thus, generally, the maximized regenerated RVA of the carbon-reduced catalyst can be greater than 0.65. But, it is most desirable for the maximized regenerated RVA to be as high as is achievable, thus, it can be greater than 0.7 and even greater than 0.75. In most instances, the practical upper limit for the maximized regenerated RVA is 0.9.

Any suitable method know in the art can be used to reduce the carbon concentration on the spent hydroprocessing catalyst to thereby provide the carbon-reduced catalyst, but a preferred method includes heat treating the spent hydroprocessing catalyst by contacting it with an oxygen-containing gas, comprising oxygen, under suitable carbon burning conditions and in a controlled manner so as to combust or burn or oxidize the carbon that is on the spent hydroprocessing catalyst and so as to provide the carbon-reduced catalyst having a reduced carbon concentration that is less than the carbon concentration on the spent hydroprocessing catalyst.

It is a particularly important aspect of the inventive process for the carbon concentration on the carbon-reduced catalyst to be controlled to within the specific ranges as noted above so that when the carbon-reduced catalyst is subsequently subjected to a treatment with the chelating agent the restored catalytic activity is maximized.

The required carbon burning conditions can be dependent upon the amount of carbon on the spent hydroprocessing catalyst and the desired carbon concentration on the carbon-reduced catalyst. Generally, the spent hydroprocessing catalyst is contacted with the oxygen-containing gas under such conditions that the temperature of the spent hydroprocessing catalyst does not exceed 500° C. with a suitable heat treatment, or carbon burning, temperature being in the range of from about 300° C. to about 500° C. The preferred carbon burning temperature is in the range of from 320° C. to 475° C., and, most preferably, from 350° C. to 425° C.

The oxygen concentration of the oxygen-containing gas can be controlled so as to provide the desired carbon burning temperature conditions. The oxygen-containing gas is preferably air, which can be diluted with other gases, for instance, inert gases such as nitrogen, to control the concentration of oxygen in the oxygen-containing gas. The carbon burn can be conducted within a combustion zone wherein is placed the spent hydroprocessing catalyst and into which is introduced the oxygen-containing gas. The time period for conducting the carbon burn is not critical and is such as to provide a carbon-reduced catalyst, having the desired carbon concentration, and it is generally in the range of from about 0.1 hours to 48 hours, or more.

The carbon-reduced catalyst, having the specifically defined carbon concentration, undergoes a treatment with a chelating agent to thereby provide a revitalized catalyst that has a restored catalytic activity. One suitable chelation treatment method is described in detail in U.S. Pat. No. 6,291,394, which is incorporated herein by reference. In the preferred treatment method, the carbon-reduced catalyst is contacted, or wetted, with a chelating agent, which is preferably dissolved in a liquid carrier, in such a manner as to assure that the chelating agent is adequately incorporated into the carbon-reduced catalyst. This contacting is then followed by an aging period during which time the chelating agent is allowed to remain on the carbon-reduced catalyst to provide an aged catalyst. This aged catalyst then undergoes a heat treatment that can include drying or calcination, or both, followed by sulfur treatment to provide a catalyst with restored catalytic activity.

The chelating agent, or chelant, suitable for use in the chelating treatment step of the inventive method includes those compounds that are capable of forming complexes with the metal components, such as any of the Group VIII metals and Group VIB metals, contained in the carbon-reduced catalyst. It is particularly important to the inventive method that the chelant have properties that provide for the restoration of catalytic activity in the carbon-reduced catalyst.

While not wanting to be bound to any particular theory, it is nevertheless believed that the chelating agent provides for the restoration of catalytic activity by re-dispersing the active metals contained in the carbon-reduced catalyst that have become agglomerated due to prior use and exposure to high temperatures, including exposure to carbon burning conditions of the hydroprocessing catalyst and its derivatives from which the carbon-reduced catalyst is derived. The amount of metal redispersion may be demonstrated and observed through electron microscopic photographs.

The chelating agent is added to the carbon-reduced catalyst in a liquid form preferably by use of a solution containing the chelating agent which complexes with the agglomerated metal of the carbon-reduced catalyst. The complexes are, thus, in a liquid phase that provides for mobility of the complexes and assists in the transport of the metal throughout the carbon-reduced catalyst to thereby provide for the re-dispersion of the metals.

Any chelant compound that suitably provides for the benefit of restored catalytic activity as required by the inventive method described herein can be used in the chelating treatment of the carbon-reduced catalyst. Among these chelant compounds are those chelating agents that contain at least one nitrogen atom that can serve as the electron donor atom for forming the complexes with the metals of the carbon-reduced catalyst.

Examples of possible nitrogen atom containing chelating agents include those compounds that can be classified as aminocarboxylic acids, polyamines, aminoalcohols, oximes, and polyethyleneimines.

Examples of aminocarboxylic acids include ethylenediaminetetraacetic acid (EDTA), hydroxyethylenediaminetriacetic acid (HEDTA), diethylenetriaminepentaacetic acid (DTPA), and nitrilotriacetic acid (NTA).

Examples of polyamines include ethylenediamine, diethylenetriamine, triethylenetetramine, and triaminotriethylamine.

Examples of aminoalcohols include triethanolamine (TEA) and N-hydroxyethylethylenediamine.

The preferred chelating agent for use in the inventive method is an aminocarboxylic acid that can be represented by the following formula:

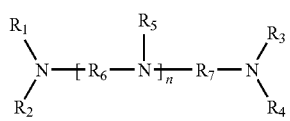

Wherein $R_1$, $R_2$, $R_3$, $R_4$ and $R_5$ are each independently selected from alkyl, alkenyl, and allyl with up to 10 carbon atoms and which may be substituted with one or more groups selected from carbonyl, carboxyl, ester, ether, amino, or amide; wherein R6 and R7 are each independently selected from an alkylene group with up to 10 carbon atoms; wherein n is either 0 or 1; and wherein one or more of the $R_1$, $R_2$, $R_3$, $R_4$ and $R_5$ has the formula:

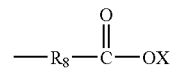

Wherein, $R_8$ is an alkylene having from 1 to 4 carbon atoms; and wherein the X is either hydrogen or another cation.

Preferred chelating agents include ethylenediaminetetraacetic acid (EDTA), hydroxyethylenediaminetriacetic acid (HEDTA), and diethylenetriaminepentaacetic acid (DTPA). The most preferred chelating agent is DTPA.

Any suitable means or method can be used to contact the carbon-reduced catalyst with the chelating agent or solution having a concentration of chelating agent; provided, such means or method provides for the suitable incorporation or impregnation of the chelating agent within the pores of the carbon-reduced catalyst. Examples of suitable methods of applying the chelating agent or chelating solution to the carbon-reduced catalyst can include dipping or spraying. A preferred method for contacting the carbon-reduced catalyst with the chelating agent or chelating solution is by any suitable impregnation method known to those skilled in the art, for instance, impregnation by incipient wetness whereby the amount or volume of chelating solution added to the carbon-reduced catalyst is such that the total volume of the added chelating solution is such that it is in the range of up to about the total pore volume of the carbon-reduced catalyst to be impregnated with the chelating solution.

The chelating solution can be a solution comprising the chelating agent and a solvent that suitably provides for the dissolution of the chelating agent. Possible solvents include water and alcohols, such as, methanol and ethanol, with water being the preferred solvent for the chelating agent. The amount of chelating agent that is applied to the carbon-reduced catalyst should be such as to provide for the desired restored catalytic activity as described herein; and, generally, the amount is such as to incorporate into the carbon-reduced catalyst chelating agent in the range of from about 0.005 moles chelant to about 1 mole chelant per mole of active metal, i.e., Group VIII and Group VIB metals described above, that is in the carbon-reduced catalyst. It is more preferred to add to the carbon-reduced catalyst an amount of chelating agent that is in the range of from 0.01 to 0.5 moles of added chelating agent per mole of hydrogenation metal in the carbon-reduced catalyst. Most preferred, the amount of chelating agent added to the carbon-reduced catalyst is in the range of from 0.05 to 0.1 moles of added chelant per mole of hydrogenation metal.

It is recognized that a significant aspect of the invention is that, by combining the carbon removal step, which provides a concentration of remaining carbon on the carbon-reduced catalyst controlled to within a specific critical range, with the chelating agent treatment step, a revitalized catalyst can be provided having a higher level of restored catalytic activity than that which is provided using alternative methods for treating a spent hydroprocessing catalyst. And, additionally, it has been discovered that in order to realize the benefit from the combined steps of a controlled carbon removal from a spent hydroprocessing catalyst followed by a chelating agent treatment of the resulting carbon-reduced catalyst, it is essential for the chelating agent treatment step to include an aging or soaking of the carbon-reduced catalyst for a sufficiently long time period. If this time period is not long enough, no significant benefit is recognized.

The carbon-reduced catalyst having incorporated therein the chelating agent is, thus, aged for an aging time period necessary to provide for the enhancement of restored catalytic activity. It is theorized that a sufficiently long aging period is required in order to allow for the chelant to react with the metals of the carbon-reduced catalyst to thereby form chelates and to allow the re-dispersion of the metals. In any event, there is a minimum time required for the aging period before a significant incremental benefit is seen in the restored catalytic activity of the carbon-reduced catalyst that is treated with the chelant. This minimum aging time can depend upon the temperature at which the aging is conducted and the type and amount, relative to the carbon-reduced catalyst, of chelant used.

Generally, for the preferred amino carboxylic acid chelating agents to obtain any significant benefit from the aging, it is important, if not essential, for the aging time period to exceed about 10 hours, but, preferably, the aging time period should exceed 20 hours, and, most preferably, 40 hours. There is also a maximum amount of aging time at which no significant incremental increase in restored catalytic activity is achieved. The maximum aging time is generally no more than 1200 hours. The preferred maximum aging time is less than 1000 hours and, more preferred, the maximum aging time is less than 750 hours. Thus, the aging time period for contacting the carbon-reduced catalyst or for allowing the chelating agent that is incorporated within the pores of the carbon-reduced catalyst to remain thereon or to soak is in the range of from about 10 hours to about 1200 hours, preferably from 20 hours to 1000 hours, and, most preferably, from 40 hours to 750 hours.

The aging temperature of which the aging is conducted can be any temperature that provides for the aged catalyst with at least some redispersion of the metals of the carbon-reduced catalyst and can generally be in the range of from about ambient temperature, for example, from about 10° C. to about 37° C., to about 50° C. or 60° C.

The aged catalyst is then subjected to a heat treatment that can include drying or calcination, or both. But, it is preferred that the aged catalyst not be subjected to calcinations conditions. The drying of the aged catalyst is to remove at least a portion of the solvent of the chelating solution from the aged catalyst while leaving at least a portion, preferably a major portion of the chelating agent on the aged catalyst. In a preferred embodiment of the invention, it is important for the dried, aged catalyst to include therein an amount or a concentration of chelant when it undergoes a sulfur treatment, which is similar, if not identical, to the sulfur treatments described above with respect to the preparation or manufacture of a high activity hydroprocessing catalyst.

In the drying of the aged catalyst it is desirable to remove as little of the chelant from the aged catalyst as is practical and, thus, more than about 50 weight percent of the chelant that is incorporated into the carbon-reduced catalyst, based on the total weight of chelant incorporated into the carbon-reduced catalyst, will remain in the resulting dried, aged catalyst. Preferably, the amount of chelant remaining on the dried, aged catalyst exceeds 75 weight percent, and, most preferably, more than 90 weight percent of the chelant originally added to the carbon-reduced catalyst remains in the carbon-reduced catalyst when it is subjected to the sulfurization treatment. Thus, less than about 50 weight percent of the chelant originally added to the carbon-reduced catalyst in the chelation treatment thereof should be removed from the aged catalyst during the drying step. Preferably, less than 25 weight percent and, most preferably, less than 10 weight percent, of the chelant incorporated into the carbon reduced catalyst is removed from the aged catalyst when it is desired.

The drying can be conducted by any suitable method known to those skilled in the art. Typically, to dry the aged catalyst, hot air or any other suitable gas, such as nitrogen and carbon dioxide, is passed over the aged catalyst. The drying temperature should not exceed 200° C., and, can generally be in the range of from 90° C. to 180° C. Preferably, the drying temperature is less than 175° C. and can range from 100° C. to 175° C. The drying step is carefully controlled in order to avoid either evaporating or converting the chelant or chelates.

In a preferred embodiment of the invention, the dried, aged catalyst having remaining therein, as discussed above, chelant or chelate is subjected to a sulfur treatment in order to re-sulfide the hydrogenation metal components that are in the oxide form. The sulfur treatment of the dried, aged catalyst is the same sulfur treatment methods as are described above with respect to the sulfur treatment of the catalyst precursor in the preparation or manufacture of the high activity hydroprocessing catalyst.

The revitalized catalyst of the invention will have a restored catalytic activity such that its RVA is greater than 0.80, but, more particularly, the RVA of the revitalized catalyst is greater than 0.85. It is preferred to maximize the amount of restored activity to a spent hydroprocessing catalyst by the inventive method, and, thus, it is preferred for the RVA of the revitalized catalyst to exceed 0.90 and, most preferably, the RVA exceeds 0.95.

The hydroprocessing catalysts treated in accordance with the methods described herein can be suitably used to hydrotreat hydrocarbon feedstocks under hydrotreating conditions as fully described hereinabove.

The following Examples are presented to illustrate the invention, but they should not be construed as limiting the scope of the invention.

Example 1

This Example 1 describes the laboratory method used to revitalize and restore catalytic activity to a commercially available hydroprocessing catalyst that had become spent through its use in the hydrotreatment of distillate feedstock.

Samples of spent CENTINEL™ DC-2118 high activity hydroprocessing catalyst were obtained from commercial users of the catalyst. CENTINEL™ DC-2118 is a high activity hydroprocessing catalyst that contains hydrogenation metal components of cobalt and molybdenum that are supported on an alumina support and is marketed by Criterion Catalysts & Technologies of Houston, Tex. The carbon concentration of each Sample A, B, C, D, E, F, G, and H respectively is presented in Table 2 below.

Each sample was subjected to a carbon burn by passing air over the sample at a temperature of less than 400° C. The burning conditions were carefully controlled in order to combust only a portion of the carbon on each sample so as to leave a residual amount of carbon on the resulting heat treated spent catalyst, or carbon-reduced catalyst. The carbon concentration of each carbon-reduced catalyst Samples A, B, C, D, E, F, G, and H respectively is presented in Table 2 below.

Samples A, B, C, F, G, and H were each subjected to a chelating agent treatment in accordance with the invention. Sample D was not subjected to a chelating agent treatment and Sample E was treated with a chelating agent but was not aged in accordance with the invention.

The chelating solution used to treat the carbon-reduced catalyst samples comprised of one (1) part by weight DTPA, 0.11 part by weight ammonium hydroxide, and 10 parts by weight water. The carbon-reduced catalyst samples were impregnated with the chelating solution by a standard incipient wetness procedure by which approximately 98 volume percent of the available pore volume of the carbon-reduced catalyst was filled with the chelating solution. Each sample of the impregnated, carbon-reduced catalyst was then well mixed and allowed to age for an aging time period of two weeks at room temperature in a sealed container to provide an aged catalyst.

The aged catalyst samples were then dried in air at a temperature of about 150° C. for a period of about 2 hours. This drying was conducted such that a major portion of the DTPA chelating agent remained on the resulting dried catalyst and that a major portion of the water was removed from the aged catalyst.

The dried catalyst was then subjected to a sulfurization step. To sulfurize the dried catalyst, 13.5 parts by weight of elemental sulfur was added to and mixed with 100 parts by weight of dried catalyst. The mixture was then brought to a temperature of about 120° C. and maintained for a period of time sufficient to incorporate the sulfur into the pores of the dried catalyst.

Following the sulfur incorporation, an alpha olefin blend containing alpha olefins having from 14 to 30 carbon atoms was incorporated into the pores of the sulfur incorporated, dried catalyst by incipient wetness. The amount of the alpha olefin added to the sulfur incorporated, dried catalyst was sufficient to fill approximately 90 volume percent of the available pore volume. The thus prepared catalyst was then subjected to a heat treatment by heating the samples in flowing air at a temperature of about 260° C. for a period sufficient to provide a dried revitalized catalyst.

Each of the Samples A, B, C, F, G, and H (i.e., revitalized samples treated in accordance with the inventive method), Sample D that was not subjected to a chelating agent treatment, and Sample E that was treated with a chelating agent but was not aged in accordance with the invention, was tested for catalytic activity in accordance with the procedure describe in Example 2.

Example 2

This Example 2 describes the laboratory testing procedure and the feedstocks used to test the catalytic activity of the revitalized catalyst samples described in Example 1 relative to the catalytic activity of fresh CENTINEL™ DC-2118 high activity hydroprocessing catalyst.

The properties of the feeds used in the performance of the activity tests are presented in Table 1. To perform the activity tests, 50 cc of the relevant catalyst sample was placed in a test reactor operated under hydrotreating reaction conditions. The reaction conditions included a reaction temperature of about 355° C., total pressure of 600 psia, a feed rate such that the liquid hourly space velocity was 1 hr⁻1, hydrogen-to-oil ratio of 1200 SCF/bbl, and an operating time of 500 hours.

TABLE 1

| Feed Properties Used in Activity Tests | | |
|---|---|---|
| FEED PROPERTIES | FEED A | FEED B |
| Sulfur, wt % | 1.83 | 1.65 |
| Nitrogen, ppm | 291 | 243 |
| Aromatics, wt % | 12.7 | 32.8 |
| Density @15.6° C., g/cc | 0.8534 | 0.8531 |

TABLE 1-continued

| Feed Properties Used in Activity Tests | | |
|---|---|---|
| FEED PROPERTIES | FEED A | FEED B |
| Bromine Number | 15.7 | 4.1 |
| TBP (by GC) | | |
| IBP (° F.) | 263 | 320 |
| 10% | 395 | 457 |
| 50% | 561 | 559 |
| 90% | 689 | 648 |
| FBP | 870 | 704 |

The results of the activity testing described in this Example 2 are presented in Table 2, and FIG. 1 presents a plot of such results. As can be seen from the presentation of the results, particularly as dramatically demonstrated by the graphical presentation of FIG. 1, the restoration of catalytic activity to the spent hydroprocessing catalyst after the chelation treatment is maximized when the carbon content is controlled within a specific range prior to the chelation treatment.

TABLE 2

| Relative Volumetric Activity of Revitalized Catalyst vs. Percent Carbon | | | |
|---|---|---|---|
| SAMPLE | WT. % CARBON AFTER BURN | RVA | FEED USED |
| FRESH CATALSYT | N/A | 1.00 | A and B |
| A | 0.14 | 0.94 | A |
| B | 1.2 | 1.00 | B |
| C | 1.29 | 0.97 | A |
| D | 1.29 | 0.77 | A |
| E | 1.29 | 0.78 | A |
| F | 1.9 | 0.97 | B |
| G | 2.02 | 0.96 | B |
| H | 3.03 | 0.86 | A |

Example 3

This Example 3 separately presents the results from the activity testing, performed as described in Example 2, of Sample C that was revitalized in accordance with the invention, Sample D that was not subjected to a chelating agent treatment, and Sample E that was treated with a chelating agent but was not aged in accordance with the invention. Table 3 presents the results from this testing.

TABLE 3

| Data Showing the Effect of Aging on Relative Volumetric Activity of Revitalized Catalyst | | | | |
|---|---|---|---|---|
| SAMPLE | WT. PERCENT CARBON | CHELANT TREATED | AGING | RVA |
| C | 1.29 | YES | YES | 0.97 |
| D | 1.29 | NO | N/A | 0.77 |
| E | 1.29 | YES | NO | 0.78 |

The data presented in Table 3 above demonstrate the improvement in catalytic activity that results from the aging of the carbon-reduced catalyst, having a carbon concentration in the optimal range, when it is treated with a chelating agent followed by aging versus treatment with no aging. The data show that there is a significant improvement in the catalytic activity of the carbon-reduced catalyst when it is subjected to a chelation treatment in which the chelant is allowed to age, but there is no improvement in catalytic activity of the carbon-reduced catalyst when it is treated with a chelant with no aging.

Reasonable variations, modifications and adaptations of the invention can be made within the scope of the described disclosure and the appended claims without departing from the scope of the invention.

That which is claimed is:

1. A method of restoring catalytic activity to a spent high activity hydroprocessing catalyst, said method comprises:
    providing said spent high activity hydroprocessing catalyst having a first carbon concentration exceeding about 3 weight percent, wherein said spent high activity hydroprocessing catalyst is a high activity hydroprocessing catalyst that has become spent by use in the hydrotreatment of a hydrocarbon feedstock under hydrotreatment conditions, and wherein said high activity hydroprocessing catalyst comprises a porous carrier and a catalytically active metal, wherein said high activity hydroprocessing catalyst is made by combining said porous carrier and said catalytically active metal in a manner so as to include a volatile compound; forming an uncalcined catalyst precursor having a volatile content in the range of from 0.5 wt. % to 25 wt. %;
    and sulfur treating said uncalcined catalyst precursor to provide said high activity hydrotreating catalyst;
    reducing the concentration of carbon on said spent hydroprocessing catalyst to thereby provide a carbon-reduced catalyst having a second carbon concentration in the range of from 0.5 weight percent to about 2.5 weight percent by contacting under carbon burning conditions said spent hydroprocessing catalyst with an oxygen-containing gas comprising oxygen and controlling the amount of carbon removed from said spent hydroprocessing catalyst so as to provide said carbon-reduced catalyst having said second carbon concentration; and
    treating said carbon-reduced catalyst with a chelating agent to thereby provide a revitalized catalyst.

2. A method as recited in claim 1, wherein said treating step comprises:
    contacting said carbon-reduced catalyst with a solution comprising said chelating agent and a solvent so as to incorporate said chelating agent in said carbon-reduced catalyst;
    aging for an aging time said carbon-reduced catalyst, having incorporated therein said solution, to thereby provide an aged catalyst wherein said aging time is sufficient to provide for restored catalytic activity to said carbon-reduced catalyst; and
    drying said aged catalyst to remove a portion of said solvent from said aged catalyst to thereby provide a dried, aged catalyst and to thus provide said revitalized catalyst.

3. A method as recited in claim 2, wherein said treating step further comprises:
    sulfur treating said dried, aged catalyst to thus provide said revitalized catalyst.

4. A method as recited in claim 3, wherein said chelating agent is selected from the group consisting of aminocarboxylic acids, polyamines, aminoalcohols, oximes, and polyethyleneimines.

5. A method as recited in claim 4, wherein said solvent of said solution is water.

6. A method as recited in claim 5, wherein said chelating agent is selected from the group consisting of ethylenediaminetetraacetic acid (EDTA), hydroxyethylenediaminetriacetic acid (HEDTA), and diethylenetriaminepentaacetic acid (DTPA).

7. A method as recited in claim 6, wherein said aging time exceeds about 10 hours.

8. A method as recited in claim 7, wherein said first carbon concentration is in the range of from 5 weight percent to 25 weight percent and said second carbon concentration is in the range of from 0.75 weight percent to 1.75 weight percent.

9. A method as recited in claim 8, wherein more than about 50 percent of said chelating agent incorporated into said carbon-reduced catalyst remains in said dried, aged catalyst.

10. A method as recited in claim 9, wherein said chelating agent is diethylenetriaminepentaacetic acid (DTPA); wherein said aging time exceeds 20 hours; wherein said first carbon concentration is in the range of from 6 weight percent to 20 weight percent; wherein more than 75 weight percent of said chelating agent incorporated into said carbon-reduced catalyst is in said dried, aged catalyst.

11. A method as recited in claim 1, wherein said treating step comprises:
    contacting said carbon-reduced spent catalyst with a solution comprising said chelating agent and a solvent so as to incorporate said chelating agent in said carbon-reduced spent catalyst;
    aging for an aging time said carbon-reduced catalyst, having incorporated therein said solution, to thereby provide an aged catalyst wherein said aging time is sufficient to provide for restored catalytic activity to said carbon-reduced catalyst; and
    drying said aged catalyst to remove a portion of said solvent therefrom and to provide said revitalized catalyst.

12. A method as recited in claim 11, further comprising the step of: sulfur treating said aged catalyst having removed said portion of said solvent therefrom to yield said revitalized catalyst.

13. A method as recited in claim 12, wherein said chelating agent is selected from the group consisting of aminocarboxylic acids, polyamines, aminoalcohols, oximes, and polyethyleneimines.

14. A method as recited in claim 13, wherein said solvent of said solution is water.

15. A method as recited in claim 14, wherein said chelating agent is selected from the group consisting of ethylenediaminetetraacetic acid (EDTA), hydroxyethylenediaminetriacetic acid (HEDTA), and diethylenetriaminepentaacetic acid (DTPA).

16. A method as recited in claim 15, wherein said aging time exceeds about 10 hours.

17. A method as recited in claim 14, wherein said first carbon concentration is in the range of from 5 weight percent to 25 weight percent and said second carbon concentration is in the range of from 0.75 weight percent to 1.75 weight percent.

18. A method as recited in claim 17, wherein said chelating agent is diethylenetriaminepentaacetic acid (DTPA); wherein said aging time exceeds 20 hours; wherein said first carbon concentration is in the range of from 6 weight percent to 20 weight percent; and wherein said second carbon concentration is in the range of from 1 weight percent to 1.5 weight percent.

19. A method as recited in claim 18, wherein less than about 50 weight percent of said chelating agent incorporated into said carbon-reduced spent catalyst is removed from said aged catalyst during said drying step.

20. A method, comprising:
- providing a spent high activity hydroprocessing catalyst having a reduced RVA and a first carbon concentration of deposited carbon, wherein said spent high activity hydroprocessing catalyst is derived from the use of a high activity hydroprocessing catalyst under hydroprocessing conditions whereby carbon is deposited thereon to give said first carbon concentration of deposited carbon;
- heat treating said spent high activity hydroprocessing catalyst by contacting said spent high activity hydroprocessing catalyst with an oxygen-containing gas under carbon burning conditions to thereby provide a heat treated spent high activity hydroprocessing catalyst having a second carbon concentration; and
- controlling said second carbon concentration by controlling said carbon burning conditions so as to provide said second carbon concentration that is in the range of from 0.5 weight percent to 2.5 weight percent; and
- subjecting said heat treated spent high activity hydroprocessing catalyst to a chelating treatment to thereby provide a revitalized catalyst having a revitalized RVA;
- wherein said high activity hydroprocessing catalyst comprises a porous carrier and a catalytically active metal, wherein said high activity hydroprocessing catalyst is made by combining said porous carrier and said catalytically active metal in a manner so as to include a volatile compound: forming an uncalcined catalyst precursor having a volatile content in the range of from 0.5 wt. % to 25 wt. %; and sulfur treating said catalyst precursor to provide said high activity hydrotreating catalyst.

21. A method as recited in claim 20, wherein said reduced RVA is less than 0.65, and wherein said revitalized RVA is at least 0.8.

22. A method as recited in claim 21, wherein said chelating treatment comprises:
- contacting said heat treated spent high activity hydroprocessing catalyst with a solution comprising said chelating agent and a solvent so as to incorporate said chelating agent in said heat treated spent high activity hydroprocessing catalyst; and
- aging for an aging time said heat treated spent high activity hydroprocessing catalyst, having incorporated therein said solution, to thereby provide an aged catalyst wherein said aging time is sufficient to provide for restored catalytic activity to said carbon-reduced catalyst to thereby provide said revitalized catalyst.

23. A method as recited in claim 22, wherein said chelating treatment further comprises drying said aged catalyst to remove a portion of said solvent therefrom to provide said revitalized catalyst.

24. A method as recited in claim 23, further comprising the step of: sulfur treating said aged catalyst having removed therefrom said portion of said solvent therefrom to yield said revitalized catalyst.

25. A method as recited in claim 24, wherein said chelating agent is selected from the group consisting of aminocarboxylic acids, polyamines, aminoalcohols, oximes, and polyethyleneimines.

26. A method as recited in claim 25, wherein said solvent of said solution is water.

27. A method as recited in claim 26, wherein said chelating agent is selected from the group consisting of ethylenediaminetetraacetic acid (EDTA), hydroxyethylenediaminetriacetic acid (HEDTA), and diethylenetriaminepentaacetic acid (DTPA).

28. A method as recited in claim 27, wherein said aging time exceeds about 10 hours.

29. A method as recited in claim 28, wherein said first carbon concentration is in the range of from 5 weight percent to 25 weight percent and said second carbon concentration is in the range of from 0.75 weight percent to 1.75 weight percent.

30. A method as recited in claim 29, wherein said chelating agent is diethylenetriaminepentaacetic acid (DTPA); wherein said aging time exceeds 20 hours; wherein said first carbon concentration is in the range of from 6 weight percent to 20 weight percent; wherein said second carbon concentration is in the range of from 1 weight percent to 1.5 weight percent; wherein said reduced RVA is less than 0.5; and wherein said revitalized RVA is at least 0.85.

31. A method comprising:
- providing a spent high activity hydroprocessing catalyst having a reduced RVA and a first carbon concentration of deposited carbon, wherein said spent high activity hydroprocessing catalyst is derived from the use of a high activity hydroprocessing catalyst under hydroprocessing conditions whereby carbon is deposited thereon to give said first carbon concentration of deposited carbon;
- heat treating said spent high activity hydroprocessing catalyst by contacting said spent high activity hydroprocessing catalyst with an oxygen-containing gas under carbon burning conditions to thereby provide a heat treated spent high activity hydroprocessing catalyst having a second carbon concentration; and
- controlling said second carbon concentration by controlling said carbon burning conditions so as to provide said second carbon concentration that is in the range of from 0.5 weight percent to 2.5 weight percent; and
- treating said heat treated spent high activity hydroprocessing catalyst with a chelating agent to provide a revitalized catalyst.

32. A method as recited in claim 31, wherein said treating step comprises:
- contacting said heat treated spent high activity hydroprocessing catalyst with a solution comprising a chelating agent and a solvent so as to incorporate said chelating agent into said heat treated spent high activity hydroprocessing catalyst; and
- aging for an aging time said heat treated spent high activity hydroprocessing catalyst, having incorporated therein said chelating agent, to thereby provide an aged catalyst wherein said aging time is sufficient to provide for restored catalytic activity to said carbon-reduced catalyst.

33. A method as recited in claim 32, wherein said treating step further comprises:
- drying said aged catalyst to remove a portion of said solvent from said aged catalyst to thereby provide a dried, aged catalyst.

34. A method as recited in claim 33, further comprising:
- sulfur treating said aged catalyst having removed said portion of said solvent therefrom to yield said revitalized catalyst.

35. A method as recited in claim 34, wherein said chelating agent is selected from the group consisting of aminocarboxylic acids, polyamines, aminoalcohols, oximes, and polyethyleneimines.

36. A method as recited in claim 35, wherein said solvent of said solution is water.

37. A method as recited in claim 36, wherein said chelating agent is selected from the group consisting of ethylenediaminetetraacetic acid (EDTA), hydroxyethylenediaminetriacetic acid (HEDTA), and diethylenetriaminepentaacetic acid (DTPA).

38. A method as recited in claim 37, wherein said aging time exceeds about 10 hours.

39. A method as recited in claim 38, wherein said first carbon concentration is in the range of from 5 weight percent to 25 weight percent and said second carbon concentration is in the range of from 0.75 weight percent to 1.75 weight percent.

40. A method as recited in claim 39, wherein said chelating agent is diethylenetriaminepentaacetic acid (DTPA); wherein said aging time exceeds 20 hours; wherein said first carbon concentration is in the range of from 6 weight percent to 20 weight percent;
wherein said second carbon concentration is in the range of from 1 weight percent to 1.5 weight percent; and
wherein said reduced RVA is less than 0.5.

41. A method of optimally revitalizing a spent hydroprocessing catalyst having a spent hydrotreating carbon concentration, said method comprises:
heat treating said spent hydroprocessing catalyst by contacting said spent hydroprocessing catalyst with an oxygen-containing gas under carbon burning conditions to thereby provide a heat treated spent hydroprocessing catalyst having a reduced carbon concentration below said spent hydrotreating carbon concentration;
controlling said reduced carbon concentration by controlling said carbon burning conditions so as to provide said reduced carbon concentration in the range of from 0.5 weight percent to 2.5 weight percent and that provides for a catalyst having a restored RVA exceeding about 0.85 after subjecting said heat treated spent hydroprocessing catalyst to a chelating treatment; and,
thereafter, subjecting said heat treated spent hydroprocessing catalyst having said reduced carbon concentration to said chelating treatment to thereby provide said revitalized catalyst.

42. A method as recited in claim 41, wherein said spent hydrotreating carbon concentration exceeds about 3.5 wt. %.

43. A method as recited in claim 42, wherein said RVA of said revitalized catalyst exceeds 0.85.

44. A catalyst having a restored activity made by the methods of any of claims 1-20, 21-42 or 43.

45. A composition, comprising:
a catalyst having a restored activity comprising a spent high activity hydroprocessing catalyst having deposited thereon a deactivating concentration of carbon, wherein a portion of said deactivating concentration of carbon is removed therefrom by the heat treatment of said spent high activity hydroprocessing catalyst in the presence of an oxygen-containing gas to give a controlled concentration of carbon in the range of from 0.5 to 2.5 weight percent and thereafter, the thus-heat treated spent hydroprocessing catalyst has been subjected to a chelating treatment.

46. A hydrotreating process, comprising:
contacting a hydrocarbon feedstock under hydrotreatment conditions with the catalyst made by the methods of any of claims 1-20, 21-42 or 43.

* * * * *